US011290869B2

(12) United States Patent
Rhelimi et al.

(10) Patent No.: US 11,290,869 B2
(45) Date of Patent: Mar. 29, 2022

(54) METHOD FOR MANAGING COMMUNICATION BETWEEN A SERVER AND A USER EQUIPMENT

(71) Applicant: THALES DIS France SA, Meudon (FR)

(72) Inventors: Alain Rhelimi, Gemenos (FR); Michel Anslot, Gemenos (FR)

(73) Assignee: THALES DIS FRANCE SA, Meudon (FR)

( * ) Notice: Subject to any disclaimer, the term of this patent is extended or adjusted under 35 U.S.C. 154(b) by 146 days.

(21) Appl. No.: 16/482,295

(22) PCT Filed: Feb. 2, 2018

(86) PCT No.: PCT/EP2018/052605
§ 371 (c)(1),
(2) Date: Jul. 31, 2019

(87) PCT Pub. No.: WO2018/141889
PCT Pub. Date: Aug. 9, 2018

(65) Prior Publication Data
US 2019/0349766 A1  Nov. 14, 2019

(51) Int. Cl.
*H04W 8/20* (2009.01)
*H04W 76/10* (2018.01)
(Continued)

(52) U.S. Cl.
CPC .............. *H04W 8/205* (2013.01); *H04L 5/14* (2013.01); *H04L 61/2061* (2013.01);
(Continued)

(58) Field of Classification Search
CPC ..... H04W 12/06; H04W 12/35; H04W 12/08; H04W 8/183; H04W 8/205; H04W 8/18;
(Continued)

(56) References Cited

U.S. PATENT DOCUMENTS 9,439,116 B2 * 9/2016 Zhang ................... H04W 60/04
9,503,956 B2 * 11/2016 Lauer ..................... H04W 40/02
(Continued)

FOREIGN PATENT DOCUMENTS

WO  2015018532 A1  2/2015

OTHER PUBLICATIONS

ETIS TS 124 008 v13.7.0 Technical Specification (Year: 2016).*
(Continued)

*Primary Examiner* — Michael A Keller
*Assistant Examiner* — Thao D Duong
(74) *Attorney, Agent, or Firm* — Marc Boillot—Thales DIS CPL USA, Inc (57) ABSTRACT

The invention is a method for communication between a server and a user equipment through a set of command/response pairs. The user equipment uses an IMSI field of an Attach Request frame as defined by ETSI TS 124.008 to convey a command to the server. The server uses an Authentication parameter RAND field or an Authentication parameter AUTN field of an Authentication Request frame as defined by ETSI TS 124.008 to convey a response corresponding to the received command. The server sends the Authentication Request frame in response to the Attach Request frame.

16 Claims, 3 Drawing Sheets (51) Int. Cl.
| | |
|---|---|
| *H04L 29/06* | (2006.01) |
| *H04L 5/14* | (2006.01) |
| *H04W 8/18* | (2009.01) |
| *H04W 8/26* | (2009.01) |
| *H04W 4/70* | (2018.01) |
| *H04L 29/12* | (2006.01) |
| *H04W 48/18* | (2009.01) |
| *H04W 4/50* | (2018.01) |
| *H04W 12/04* | (2021.01) |
| *H04W 12/06* | (2021.01) |
| *H04W 12/30* | (2021.01) |
| *H04W 12/041* | (2021.01) |
| *H04W 12/069* | (2021.01) |
| *H04W 12/42* | (2021.01) |
| *H04L 67/01* | (2022.01) |
| *H04L 61/5061* | (2022.01) |
| *H04L 61/5092* | (2022.01) |
| *H04L 101/654* | (2022.01) |

(52) U.S. Cl.
CPC ...... *H04L 61/2092* (2013.01); *H04L 63/0853* (2013.01); *H04L 67/42* (2013.01); *H04W 4/50* (2018.02); *H04W 4/70* (2018.02); *H04W 8/183* (2013.01); *H04W 8/26* (2013.01); *H04W 8/265* (2013.01); *H04W 12/04* (2013.01); *H04W 12/041* (2021.01); *H04W 12/06* (2013.01); *H04W 12/069* (2021.01); *H04W 12/35* (2021.01); *H04W 48/18* (2013.01); *H04W 76/10* (2018.02); *H04L 61/6054* (2013.01); *H04W 12/42* (2021.01)

(58) Field of Classification Search
CPC .... H04B 1/3816; H04B 7/26; H04B 7/15507; H04B 7/18515; H04L 63/20; H04L 63/0236; H04L 63/0876
See application file for complete search history.

(56) References Cited

U.S. PATENT DOCUMENTS

| | | | |
|---|---|---|---|
| 10,212,165 B1* | 2/2019 | Petersen | H04W 12/06 |
| 2010/0064344 A1* | 3/2010 | Wang | H04L 9/0891 |
| | | | 726/3 |
| 2012/0309374 A1* | 12/2012 | Tagg | H04W 12/40 |
| | | | 455/418 |
| 2014/0098957 A1* | 4/2014 | Larsson | H04W 8/245 |
| | | | 380/270 |
| 2015/0038116 A1* | 2/2015 | Lodeweyckx | H04L 63/0853 |
| | | | 455/411 |
| 2016/0183095 A1* | 6/2016 | Huber | H04L 67/303 |
| | | | 455/411 |
| 2016/0262015 A1* | 9/2016 | Lee | H04W 12/02 |

OTHER PUBLICATIONS

International Search Report (PCT/ISA/210) dated May 17, 2018, by the European Patent Office as the International Searching Authority for International Application No. PCT/EP2018/052605.
Written Opinion (PCT/ISA/237) dated May 17, 2018, by the European Patent Office as the International Searching Authority for International Application No. PCT/EP2018/052605.
European Search Report for EP 17305124.4 dated Jul. 21, 2017 (8 pages).
Office Action dated Sep. 1, 2021, in corresponding Chinese Patent Application No. 201880021525.X. (7 pages).

* cited by examiner

METHOD FOR MANAGING COMMUNICATION BETWEEN A SERVER AND A USER EQUIPMENT

FIELD OF THE INVENTION

The present invention relates to methods of managing communication between a server and a user equipment. It relates particularly to methods of establishing a communication channel between a server and a Telecom user equipment devoid of full Telecom credentials.

BACKGROUND OF THE INVENTION

In order to securely connect a telecom communication network, a user equipment needs to be provisioned with full Telecom credentials known as the couple IMSI/Ki, where IMSI is a unique identifier of the telecom subscription and Ki a secret key uniquely allocated to the subscription by a mobile network operator.

The couple IMSI/Ki is usually stored in a tamper resistant element which may be a SIM card, a Universal Integrated Circuit Card (UICC), an embedded secure element (e.g. eUICC), a software secure enclave or a secure element integrated (i.e. iUICC) within a System On Chip (SOC).

A tamper resistant element is considered as secure because it is able to control the access to the data it contains and to authorize or not the use of its data by other machines or entities. Tamper resistant elements may also provide computation services based on cryptographic components (a.k.a. crypto processor). In general, tamper resistant elements have limited computing resources and limited memory resources and they are intended to be connected to a host machine which provides them with electric power. Tamper resistant elements may be removable or fixed to a host machine.

Due to manufacturing process, a user equipment (and its tamper resistant element) can be issued without a couple IMSI/Ki.

There is a need to securely establish a communication session between such a user equipment and a server intended to allow the user equipment to get a couple IMSI/Ki.

SUMMARY OF THE INVENTION

An object of the invention is to solve the above mentioned technical problem.

An object of the present invention is a method of communication between a server and a user equipment through a set of command/response pairs. The user equipment uses an IMSI field of an Attach Request frame as defined by ETSI TS 124.008 to convey a command of one of said pairs to the server. The server uses an Authentication parameter RAND field or an Authentication parameter AUTN field of an Authentication Request frame as defined by ETSI TS 124.008 to convey a response corresponding to the received command. The server sends the Authentication Request frame in response to the Attach Request frame.

Advantageously, the user equipment may use a MSIN part of the IMSI field to send the command.

Advantageously, the user equipment may send an initial command to retrieve a session identifier, the server may send the session identifier in response to the initial command and the user equipment may include the session identifier in all subsequent commands sent to the server until a session close command.

Advantageously, the user equipment may store a target identifier uniquely allocated to said user equipment, the server may comprise a range of transaction identifiers, the command may comprise a parameter generated from the target identifier and the server may find the target identifier in the range thanks to said parameter.

Advantageously, UH denoting 64 most significant bits of the target identifier, $PHL_n$ denoting 64 most significant bits of the lower bound of the range, $PHH_n$ denoting 64 most significant bits of the upper bound of the range, H denoting a probe value comprised in the parameter, the user equipment may receive from the server both $PHH_n$ and $PHL_n$, H being equal to $((UH-PHL_n)*100000)/(PHH_n-PHL_n)$. The server may generate an updated $PHL_{n+1}$ equal to $PHL_n+(H*(PHH_n-PHL_n)/100000)$ and may generate an updated $PHH_{n+1}$ equal to $PHL_n+((H+1)*(PHH_n-PHL_n)/100000)$.

Advantageously, the user equipment may embed a tamper resistant element. The user equipment may send a command to request an IMSI allocated to the user equipment. In response, the server may select the IMSI thanks to the target identifier and return the IMSI. The user equipment may forward the IMSI to the tamper resistant element.

Advantageously, the user equipment may send a command to request a key allocated to a mobile operator and required to generate credentials needed to securely access a communication network. In response, the server may select the key thanks to the target identifier and return the key. The user equipment may forward the key to the tamper resistant element and the tamper resistant element may compute said credentials from both the key and a seed pre-stored in the tamper resistant element.

Advantageously, the seed may be retrieved from user equipment and sent to the mobile operator. The mobile operator may generate a MNO key pair comprising a private MNO key and a public MNO key, generate the IMSI and compute a Ki from the seed. The public MNO key may be the key allocated to the mobile operator. The mobile operator may send to the server the public MNO key, the IMSI and the target identifier.

Advantageously, the mobile operator may verify that the tamper resistant element is authentic by requesting a third party to check the seed.

Advantageously, the user equipment may embed a baseband. The baseband may send any command of said set without using the tamper resistant element for retrieving from the server an IMSI and a key allocated to a mobile operator. The baseband may forward both said IMSI and said key to the tamper resistant element. The tamper resistant element may compute a derived connection credentials according to 3GPP key derivation mechanism.

Another object of the invention is a user equipment comprising a processor and able to communicate with a server through a set of command/response pairs. The user equipment comprises a communicating agent adapted to be run by the processor for generating and sending an Attach Request frame as defined by ETSI TS 124.008 to convey a command of one of said pairs to the server, the command being comprised in an IMSI field of an Attach Request frame. The communicating agent is adapted to be run by the processor for receiving, in response to the Attach Request frame, a response corresponding to said command conveyed in a Authentication parameter RAND field or a Authentication parameter AUTN field of an Authentication Request frame as defined by ETSI TS 124.008.

Advantageously, the user equipment may be configured to send to the server the following series of ordered commands: request a session identifier, transmission of a target identifier, request of an IMSI, request of a key allocated to a mobile operator and session closing.

Advantageously, UH denoting 64 most significant bits of the target identifier (14), $PHL_n$ denoting 64 most significant bits of the lower bound of a range stored in the server (30), $PHH_n$ denoting 64 most significant bits of the upper bound of the range, the user equipment may embed a tamper resistant element comprising a processor and a software probe agent which is adapted to be run by the processor of the tamper resistant element for generating a probe value (H) equal to $((UH-PHL_n)*100000)/(PHH_n-PHL_n)$.

Another object of the invention is a server comprising a processor and able to communicate with a user equipment through a set of command/response pairs. The server comprises a provisioning agent adapted to be run by the processor for receiving an Attach Request frame as defined by ETSI TS 124.008 to convey a command of one of said pairs from the user equipment, said command being comprised in an IMSI field of an Attach Request frame. The provisioning agent is adapted to be run by the processor for generating and sending, in response to the Attach Request frame, a response corresponding to said command conveyed in an Authentication parameter RAND field or an Authentication parameter AUTN field of an Authentication Request frame as defined by ETSI TS 124.008.

Advantageously, the user equipment may be intended to store a target identifier uniquely allocated to said user equipment. The server may store a range of transaction identifiers. The command may comprise a parameter generated from the target identifier and the server may be configured to find the target identifier in the range by using said parameter.

Advantageously, UH denoting 64 most significant bits of the target identifier, $PHL_n$ denoting 64 most significant bits of the lower bound of the range, $PHH_n$ denoting 64 most significant bits of the upper bound of the range, H denoting a probe value comprised in the parameter, the server may be configured to send to the user equipment both $PHH_n$ and $PHL_n$, wherein H is equal to $((UH-PHL_n)*100000)/(PHH_n-PHL_n)$. The server may be configured to generate an updated $PHL_{n+1}$ equal to $PHL_n+(H*(PHH_n-PHL_n)/100000)$ and to generate an updated $PHH_{n+1}$ equal to $PHL_n+((H+1)*(PHH_n-PHL_n)/100000)$.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any type of user equipment intended to be provisioned with full telecom credential.

Such a user equipment may be a smartphone, a tablet, a personal computer, a smart watch, a vehicle, a meter, a slot machine, a TV or a computer for example.

The invention takes advantage of the communication protocols usually implemented in the Telecom devices by using them in a totally new way. The user equipment and the server communicates through a mechanism of command/response pairs, where a command is sent by the user equipment and a response is returned by the server. The user equipment uses an Attach Request frame as defined by ETSI TS 124.008 (e.g. Version 8.6.0 dated 2009-07) to convey a command through the IMSI field of this frame. The server uses an Authentication Request frame as defined by ETSI TS 124.008 (e.g. Version 8.6.0 dated 2009-07) to convey the response corresponding to the received command through one (or both) of the Authentication parameter RAND or Authentication parameter AUTN fields of this frame.

It is to be noted that the server does not send the conventional response to Attach Request as specified by TS 124.008.

Preferably, the user equipment uses the MSIN (Mobile Subscriber Identification Number) part of the IMSI field of the Attach Request frame to convey data towards the server. For example, the MSIN part may be split in three areas:
- 3 digits reserved to code the session identifier (also named allocated slot),
- 5 digits reserved to the payload,
- 1 digit reserved for the command identifier.

Preferably the user equipment and the server are configured to use the following convention for the new set of commands:
- '0' for a request of new session identifier,
- '1' for the transmission of the unique identifier allocated to the user equipment,
- '2' for a request of IMSI,
- '3' for a request of key allocated to the subscription/Mobile operator,
- '4' to '8' for sequence number if a command needs to be split in several subsequent frames,
- '9' for closing the session (i.e. session terminated).

Advantageously, the sequence number can be managed in a loop way: when reaching '8' it continues with '4' (i.e. circular succession/modulo where there is a renumbering from '4'.) Thus there is no limit to the number of subsequent frames.

Figure 1:
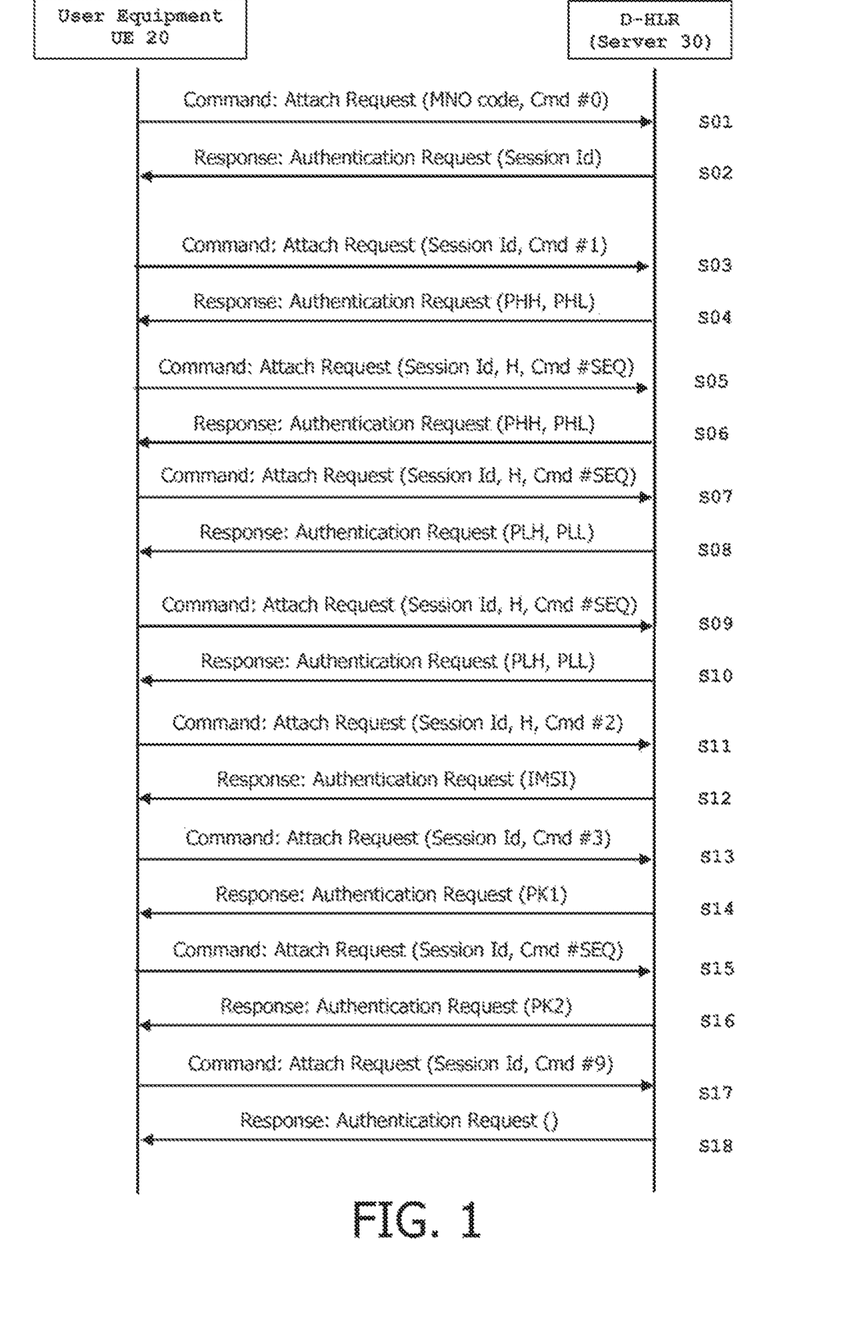
FIG. 1 shows a flow diagram of communication management between a user equipment and a server according to an example of the invention.

FIG. 1 shows a flow diagram of a communication management according to an example of the invention.

The user equipment 20 is assumed to be pre-provisioned with an ephemeral credential and a unique identifier UUIDue also named target identifier 14. In this example, the server 30 is a Home Location Register (HLR or D-HLR).

At step S01, the user equipment 20 initiates the exchange with the server 30 by sending a first command requesting a session identifier. Optionally, the sent payload may comprise a MNO code allowing the server 30 to identify the Mobile network operator for which Telecom credentials are to be provisioned in the user equipment 20. For instance, the MNO code can be computed as a hash (having a 5 digits length) of the name of the Mobile network operator.

At step S02, the server 30 selects a session identifier and sends it to the user equipment through an Authentication Request frame in response to the command received at step S01. Preferably, the session identifier is conveyed in the Authentication parameter RAND field.

At step S03, the user equipment 20 initiates the transmission of the unique identifier (UUIDue) allocated to the user equipment. Assuming that the length of the UUIDue is bigger than the size of the available payload, several Attach Request frames are needed. Further Attach Request frames can be sent with a command identifier equal to '4' to '8', where these values are sequence numbers allowing the server to consider the series of Attach Request frames together.

The server 30 is assumed to be pre-provisioned with a range of transaction identifiers. This range may contain holes if certain transaction identifiers have already assigned to user equipment.

In a preferred embodiment, the UUIDue is 16-bytes long. In order to decrease the number of needed Attach Request frames, an improvement can be implemented with the following algorithm.

Assuming that:

- N as the number of available transaction identifiers in the server 30 which are likely to match the UUIDue (i.e. the target identifier 14). In other words, N is the number of free transaction identifiers in the range stored at server.
- $PHL_n$ denotes the 64 most significant bits of the lower bound of the available range.
- $PHH_n$ denoting 64 most significant bits of the upper bound of the available range.
- UH denotes the 64 most significant bits of the UUIDue (target identifier 14).
- $PLL_n$ denotes the 64 lowest significant bits of the lower bound of the available range.
- $PLH_n$ denoting 64 lowest significant bits of the upper bound of the available range.
- UL denotes the 64 lowest significant bits of the UUIDue (target identifier 14).
- H denoting a probe value to be sent by the user equipment to the server.

The user equipment 20 receives from the server 30 both $PHH_n$ and $PHL_n$. This sending can be done at step S04 in response to the command of step S03.

At step S05 the user equipment computes H as being equal to $((UH-PHL_n)*100000)/(PHH_n-PHL_n)$ and sends H to the server.

At step S06, the server 30 generates an updated $PHL_{n+1}$ equal to $PHL_n+(H*(PHH_n-PHL_n)/100000)$ and an updated $PHH_{n+1}$ equal to $PHL_n+((H+1)*(PHH_n-PHL_n)/100000)$. The server 30 sends both the updated $PHL_{n+1}$ and the updated $PHH_{n+1}$ to the user equipment.

At step S07, the user equipment computes H as described above and sends it to the server.

In this example, the server successfully identified the 64 most significant bits of the UUIDue. Thus at step S08, the server sends in response both $PLH_n$ and $PLL_n$.

The same algorithm is performed again for the lowest significant bits at steps S09-S10. In this example, the server successfully identified the 64 lowest significant bits of the UUIDue at step S10 and sends a response to notify the user equipment of the end of the transmission of UUIDue.

Then at step S11, the user equipment sends a command requesting an IMSI. In response, the server sends the IMSI at step S12 through an Authentication Request frame.

At step S13, the user equipment sends a command requesting a key allocated to the subscription/Mobile operator. Preferably, this key is an ephemeral key which is used by the user equipment to generate the final Ki. Due to the usual size of an ephemeral key, two exchanges are required to transfer the two whole key (PK1 and PK2 parts) in the example of FIG. 1. (Steps S13-16).

At this point the user equipment can generate the Ki by using both the received ephemeral key and a seed preset in the user equipment. Preferably, the user equipment embeds a tamper resistant element which stored the seed and performs the generation of the Ki.

At step S17, the user equipment sends a command for closing the session. At this point, the session identifier can be released and re-allocated to another user equipment by the server. A response is returned by the server at step S18 to notify the user equipment of the end of the session. The server can resume the allocated slot and reassign it to another device.

It is to be noted that the session identifier allows the server to identify the relevant user equipment among a plurality of incoming messages.

In other words, the following algorithm may be user for minimizing the number of Attach Request frames required before the server knows the value of the UUIDue.

This algorithm uses the principle of dichotomy at a scale of 100 000 instead of 2.

The server will maintain a dynamic lower bound and a dynamic upper bound of its range. Progressively, the server will restrict the range of search value thanks to the probe value (i.e. H) transmitted by the user equipment. Thus the dynamic lower bound and the dynamic upper bound will converge to a single value corresponding to that which is sought. The enhanced principle of dichotomy is performed twice: one for the most significant bits and the other one for the lowest significant bits.

```
// 64 MSB (most significant bits) part
For X = 0 to 5
    User equipment computes:
        H = ((UH − PHL_n) * 100000)/(PHH_n − PHL_n) and sends
    H to server.
        At server: IF (PHH_n − PHL_n) = 0 THEN QUIT LOOP
        END IF
```

The server generates an updated $PHL_{n+1}$ equal to $PHL_n+(H*(PHH_n-PHL_n)/100000)$ and an updated $PHH_{n+1}$ equal to $PHL_n+((H+1)*(PHH_n-PHL_n)/100000)$ and sends both the updated $PHL_{n+1}$ and the updated $PHH_{n+1}$ to the user equipment.

```
NEXT X
IF X < 6
    // 64 LSB (lowest significant bits) part
    For X = 0 to 5
        User equipment computes:
            H = ((UH − PLL_n) * 100000)/(PLH_n − PLL_n) and sends
        H to server.
            At server: IF (PLH_n − PLL_n) = 0 THEN QUIT LOOP
            END IF
```

The server generates an updated $PLL_{n+1}$ equal to $PLL_n+H*(PLH_n-PLL_n)/100000)$ and an updated $PLH_{n+1}$ equal to $PLL_n+((H+1)*(PLH_n-PLL_n)/100000)$ and sends both the updated $PLL_{n+1}$ and the updated $PLH_{n+1}$ to the user equipment.

```
NEXT X
END IF
IF X < 6
    // The UUID_UE has been successfully transferred
END IF
```

It is to be noted that if none of the loop converges after 5 steps then the $UUID_{UE}$. Does not belong the range of the server.

The maximum number of loops (as much as exchanges) is 2×Log(N)/Log(100000). For example if N=1.000.000 of available transaction identifiers in the range of the server then the number of exchange is less or equal than 4.

If in the range of the server there is no transaction identifiers matching (i.e. whose value is equal to) the targeted $UUID_{UE}$, then the server can peek a temporary IMSI in a pool of pre-negotiated subscriptions related to the mobile operator (the MNO code of the command sent at step S01 can be used to identify the mobile operator). In this case, the server performs a dynamic assignment and notifies the mobile operator that the temporary IMSI is assigned to the user equipment.

By reference to step S02, the server may advantageously send $PHH_n$ and $PHL_n$ in the RAND and AUTN fields of the Authentication Request so that the user equipment can compute the probe value H before sending the first Attach Request frame for the UUIDue transmission at step S03. By using RAND and AUTN the operations are performed by using 128 bit boundaries instead 64 bit then the steps S07 and S08 can be removed.

Before the step S01, some previous steps may be performed in order to populate the server 30.

For example, the seed can retrieved from user equipment 20 by an OEM (Original Equipment Manufacturer) and sent to a mobile operator. Then the mobile operator can generate a MNO asymmetric key pair comprising a private MNO key and a public MNO key. The mobile operator can generate an IMSI and compute a Ki from the seed. Then the mobile operator sends to the server 30 the triplet: public MNO key+the IMSI+the transaction identifier. The server 30 can add this triplet into the range of transaction identifiers it stores. This way, the server can be populated with a large number of triplets corresponding to as many user equipment (or as many tamper resistant elements).

Figure 4:
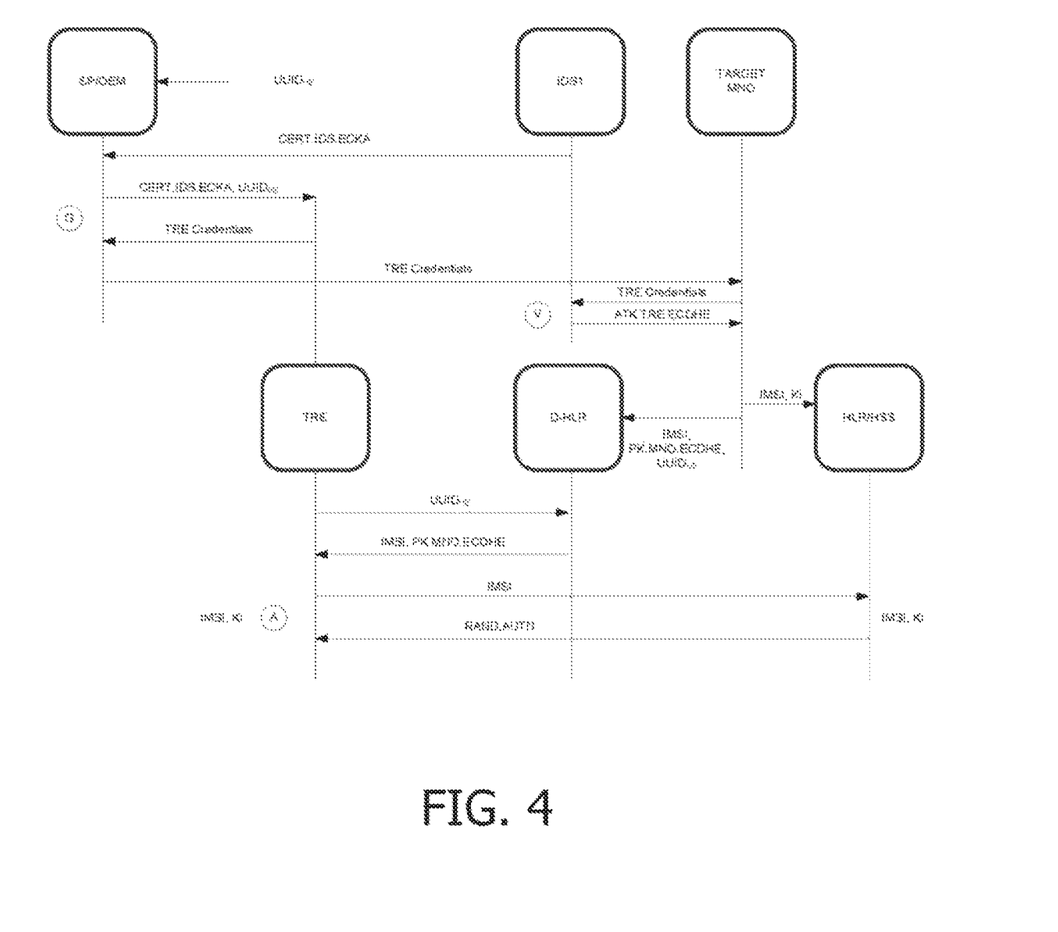
FIG. 4 shows a flow diagram of communication management for provisioning the tamper resistant element of a user equipment with Telecom credentials according to an embodiment of the invention.

FIG. 4 shows a flew a flow diagram of communication management for provisioning the tamper resistant element (TRE) of a user equipment with Telecom credentials according to an embodiment of the invention.

The following notations are used below.
CERT.X.ECDSA: ECDSA static certificate of X
SK.X.ECDSA: ECDSA private key of X for signature
PK.X.ECDSA: ECDSA public key of X for signature
SK.X.ECDHE: ECDHE private key of X (ephemeral)
ATK.X.ECDHE: ECDHE Authentication Token (dynamic certificate of X for key agreement)
CERT.X.ECKA: ECKA static certificate of X for key agreement
SK.X.ECKA: ECKA private key of X for key agreement
PK.X.ECKA: ECKA public key of X for key agreement
PK.X.ECDHE: ECDHE public key of X (ephemeral)
VERIFY(Y)[X]: Verify X with the key Y
SIGN(Y)[X, . . . ]: Sign X with the key Y
DERIVE(X)[Y]: Compete a shared session key from a private key X and a certificate/authentication token Y
{SK,PK}=ECDHE( ): Generate an ephemeral ECDH keys ( ): pair.
{M,I}=ENCRYPT(Y)[X]: Encrypt X with the key Y. Get the [X]: cryptogram M and the integrity check I
X=DECRYPT(Y,I)[M]: Decrypt M with the key Y and check
[M]: the integrity by using I. Get the clear text X The following references are used:
[a] AES128: Specification for the Advanced Encryption Standard (AES)—FIPS PUB 197
[b] BSI Technical Guideline TR-03111: Elliptic Curve Cryptography—Version 2.0
[c] SHA-256: Specifications for the Secure Hash Standard—FIPS PUB 180-3, 2008

The following operations can be performed:

Signing

CERT.X.ECDSA=SIGN(SK.Y.ECDSA)[PK.X-.ECDSA,X0,X1,X2,X3 . . . ]

ATK.X.ECDHE=SIGN(SK.W.ECDSA)[PK.X-.ECDHE,X0,X1,X2,X3 . . . ]

where X0, X1, X2, X3, . . . are optional values to sign

Verification

VERIFY(CERT.Y.ECDSA)[CERT.X.ECDSA] return a Boolean (TRUE when successful) by using the PK.Y.ECDSA in CERT.Y.ECDSA Derivation $KS_{XY}^N$=DERIV(SK.X.A)[B.Y.C] where $KS_{XY}^N$ is the shared secret key(s)
$KS_{YX}^N$=DERIV(SK.Y.C)[B.X.A] where $KS_{YX}^N$ is the shared secret key(s)
Where:
A is ECKA or ECDHE
B is CERT or ATK
C is ECKA or ECDHE
$KS_{XY}^N$=$KS_{YX}^N$
$KS_{XY}^N$ or $KS_{YX}^N$ is a matrix of N keys: $KS_{XY}[1]$, $KS_{XY}[2]$, . . . $KS_{XY}[N]$, Key Derivation Function The function DERIVE(X)[Y] allows the computation of a matrix of N shared secret key $Ks^N$ from the private key X and a public key Y within a certificate or an authentication token in [b]. The procedure starts from the computation of a shared secret ECKA-EG or ECKA-DH as defined in [b] and a Key Derivation Function:
The KDF-128 is a X9.63 Key Derivation Function in [a] by using a SHA-256 in [c] and generating a set of N×128 bit derived keys K[1] to K[N] as the Elements of the a matrix.

$Ki_n$=KDF-128(ShS,I,SI)

Where
ShS: the shared secret 256 bit from the Key Agreement Algorithm ECKA-EG (using a static key and an ephemeral key) or ECKA-DH (using two ephemeral keys) as defined in [b]
I: a counter 32 bit value between 1 to N
SI: the Shared Info as SI=N∥KEY_TYPE∥128
KEY_TYPE: '10' for KS1
KEY_TYPE: '20' for KS2
The KDF function is a SHA256 in [8].

Enciphering/Deciphering Function

The encryption and the decryption of data is a symmetrical function based on the eGCM-128 Algorithm.

$M_{DST}$,$H_{CHECK}$=eGCM-AES128(K,IV,EIV)[$M_{SRC}$]

Where:
K: 128 bit Encrypting/Decrypting and integrity key
IV: 128 bit Initial Value Integrity check $M_{SRC}$: Message stream to encrypt/decrypt. The length of the message shall be a multiple of 128 bit block padded with 'FF'.

EIV: 128 bit Initial Value Encrypting Key $M_{DST}$: Encrypted/decrypted Message stream. The length of the encrypted message is the same than the $M_{SRC}$ message $H_{SRC}$: 128 bit Integrity check result of the clear text (source)

All keys and initial values are derived from the key derivation function as follow:

K=K[1] in KDF-128
IV=K[2] in KDF-128
EIV=K[3] in KDF-128

Consequently the generic notation as $M_{DST},H_{SRC}$=ENCRYPT(KS$^3$)[$M_{SRC}$]

targeting $M_{DST},H_{SRC}$=eGCM-128(K,IV,EIV)[$M_{SRC}$]

is $M_{DST},H_{SRC}$=eGCM-128(KS[1],KS[2],KS[3])[$M_{SRC}$]

Other encryption and integrity check algorithms can be efficiently used.

We are proposing eGCM-128 has a method of encryption but CBC-AES-128 in FIPS-PUB-81 and HMAC-SHA256 in FIPS PUB 198-1 can replace it for easing the acceptance of the protocols.

MDST=CBC-AES-128(KE,IV)[MSRC]

HSRC=HMAC-SHA256(KH)[MSRC]

Where

KE: 128 bit Encrypting/Decrypting and integrity key: K[1] in KDF-128

IV: 128 bit Initial Value Integrity check: K[2] in KDF-128

MSRC: Message stream to encrypt/decrypt. The length of the message shall be a multiple of 128 bit block padded with "FF".

KH: 128 bit Initial Key: K[3] in KDF-128

MDST: Encrypted/decrypted Message stream. The length of the encrypted message is the same than the MSRC message HSRC: 128 bit Integrity check result of the clear text (source)

Long Term Keys

The user equipment is assumed to embed a Tamper Resistant Element (TRE) able to host secrets and securely perform cryptographic computations.

The long term keys for the TRE are the following:
CERT.PN.ECDSA:=SIGN(SK.CI.ECDSA)[PK.PN.ECDSA]. Part Number certificate of the TRE signed by the CI
CERT.TRE.ECDSA:=SIGN(SK.PN.ECDSA)[PK.TRE.ECDSA]. Certificate of the TRE signed by the PN private key SK.PN.ECDSA
SK.TRE.ECDSA:=Private static key of the TRE
CERT.CI.ECDSA:=Certificate Issuer root The long term keys for the IDS are the following:
CERT.IDS.ECKA:=SIGN(SK.CI.ECDSA)[PK.IDS.ECKA]
SK.IDS.ECKA:=Private static key of the IDS for key agreement hosted in the HSM1
CERT.CI.ECDSA:=Certificate Issuer root

TRE Credentials Generation

VERIFY(CERT.CI.ECDSA)[CERT.IDS.ECKA]
KS1$^3$=DERIVE(SK.TRE.ECDHE)[CERT.IDS.ECKA]
M1,H1=ENCRYPT(KS1$^3$)[CERT.TRE.ECDSA]
{SK.TRE.ECDHE,PK.TRE.ECDHE}=ECDHE( )
ATK.TRE.ECDHE=SIGN(SK.TRE.ECDSA)[PK.TRE.ECDHE,IsSN,UUID$_{UE}$]
CERT.PN.ECDSA, ATK.TRE.ECDHE, M1, H1 are the TRE credentials and ISSN is a boolean

TRE Credentials Verification

KS1$^3$=DERIVE(SK.IDS.ECKA)[ATK.PBL.ECDHE]
CERT.PBL.ECDSA=DECRYPT(KS1$^3$)[M1]
VERIFY(CERT.CI.ECDSA)[CERT.PN.ECDSA]
VERIFY(CERT.PN.ECDSA)[CERT.TRE.ECDSA]
VERIFY(CERT.TRE.ECDSA)[ATK.TRE.ECDHE]

Ki Computation by the MNO

{SK.MNO.ECDHE,PK.MNO.ECDHE}=ECDHE( )
Ki=DERIVE(SK.MNO.ECDHE)[ATK.TRE.ECDHE]

Ki Computation by the TRE

Ki=DERIVE(SK.TRE.ECDHE)[PK.MNO.ECDHE]

At phase G of FIG. 4, a Service Provider or a user equipment OEM maker (SP/OEM) generates a UUID$_{UE}$ or gets a UUID$_{UE}$ from the user equipment.

Advantageously, the UUID$_{UE}$ can be generated by the user equipment according to a specific formula which provides some mathematical properties. For instance, the following formula can be used:

$$UUID_{UE}=AES128[K_{TRE}^{SI}](Rand|CATV|SN)$$

wherein:

Rand: is a 62 bit random value,

CATV: is a 16 bit secret constant pattern for checking a successful decoding of SN, SN: the serial number of the tamper resistant element, $K_{TRE}^{SI}$: A secret key managed by the tamper resistant element.

Advantageously, the SP/OEM can get a certificate of a certification authority/issuer (CI) as CERT.IDS.ECDSA and inject in the tamper resistant element both CERT.IDS.ECKA and UUID$_{UE}$. The SP/OEM can get the TRE credentials from the user equipment. Preferably, according to a commercial agreement with a mobile operator (MNO), the SP/OEM transfers the credentials.

At phase V of FIG. 4, the mobile operator can transfer the TRE credentials for verification to IDS. The IDS counter signs ATK.TRE.ECDHE and returns it to the MNO. The MNO gets the evidence that the TRE is authentic and retrieves:

PK.TRE.ECDHE
UUID$_{UE}$
ISSN=TRUE If SN'=SN with Rand'|CATV|SN'=AES128$^{-1}$[K$_{TRE}^{SI}$](UUID$_{UE}$)

By checking ISSN, the MNO evaluates that the UUID$_{UE}$ is linked with the TRE in order to prevent the "racing attack" where a fraudulent actor can get the UUID$_{UE}$ by spying the data exchange and uses it with another TRE in another UE.

The MNO generates a key pairs as

{SK.MNO.ECDHE,PK.MNO.ECDHE}=ECDHE( )

The MNO generates an IMSI and compute Ki

Ki=DERIVE(SK.MNO.ECDHE)[ATK.TRE.ECDHE]

The MNO transfers to the D-HLR:
PK.MNO.ECDHE
IMSI
UUID$_{UE}$

The MNO transfers IMSI and Ki to its HLR/HSS (a.k.a Home Location Register/Home Subscriber Server)

At phase A of FIG. 4, the TRE communicates its UUID$_{UE}$ to the server (D-HLR) as described at FIG. 1 for example. Then the TRE gets the IMSI and the PK.MNO.ECDHE. The TRE computes Ki and performs a usual 3GPP authentication to the HLR/HSS of the MNO It is to be noted that the mobile operator may verify the genuineness of a tamper resistant element by checking the seed of the tamper resistant element. For example, the seed may be a public key belonging to an asymmetric pair previously assigned to the tamper resistant element. As well the authentication of the TRE can be indirectly done if the UE is able to connect the 3GPP network by using the MNO credentials which can only decrypted by a genuine TRE.

Figure 2:
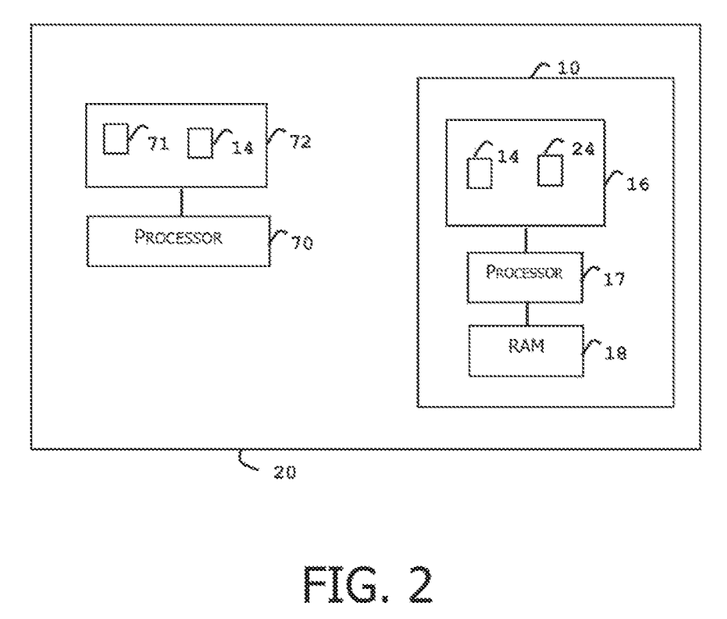
FIG. 2 depicts schematically an architecture of a user equipment according to an example of the invention.

FIG. 2 shows schematically an architecture of a user equipment 20 according to an example of the invention.

The user equipment 20 comprises a processor 70 and a nonvolatile memory 72. It is configured to communicate with a distant server through command/response pairs.

The user equipment 20 comprises a software communicating agent 71 which is adapted to be run by the processor 70 for generating and sending an Attach Request frame as defined by ETSI TS 124.008 to convey a command to the server. The software communicating agent 71 is adapted to include the command in the IMSI field of the Attach Request frame. The software communicating agent 71 is also adapted to be run by the processor 70 for receiving, in response to the Attach Request frame, a response corresponding to said command conveyed in the Authentication parameter RAND field or the Authentication parameter AUTN field of an Authentication Request frame as defined by ETSI TS 121.008.

In the example of FIG. 2, the user equipment embeds a tamper resistant element 10 which comprises its own processor 17, a volatile memory 18 and a nonvolatile memory 16. The nonvolatile memory 16 stores a UUID$_{UE}$ 14 and a seed 24 required to compute the long term Ki. The nonvolatile memory 16 comprises a software probe agent 34 which is adapted to be run by the processor 17 for generating the probe value H equal to ((UH−PHL$_n$)*100000)/(PHH$_n$−PHL$_n$) for the MSB and ((UH−PLL$_n$)*100000)/(PLH$_n$−PLL$_n$) for LSB.

As well the UE can perform from the baseband without the use of the TRE, the sending of the UUID$_{UE}$ and the getting of the MNO credentials (IMSI and PK.MNO.ECDHE). Consequently, the UE baseband can get the IMSI and PK.MNO.ECDHE from the D-HLR then forward it to the TRE which will compute the derived connection credentials according to the 3GPP key derivation.

Figure 3:
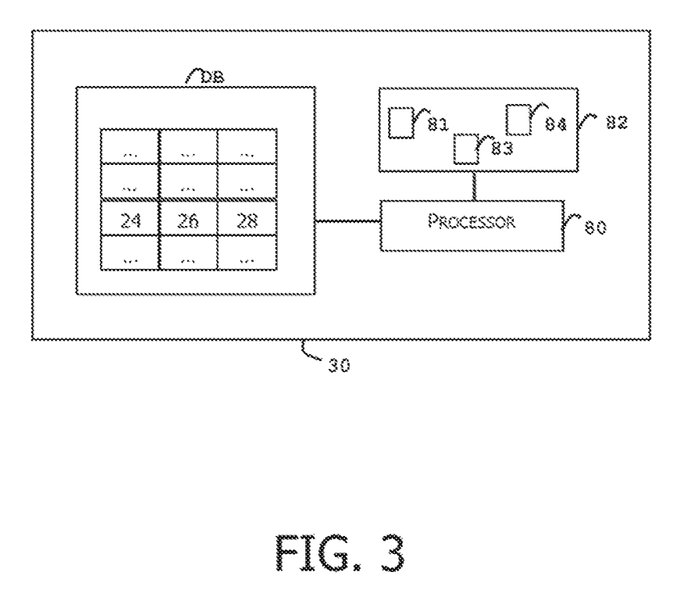
FIG. 3 depicts schematically an architecture of a server according to an example of the invention.

FIG. 3 shows schematically an architecture of a server 30 according to an example of the invention The sever 30 comprises a processor 80 a nonvolatile memory 82 and a storage area DB. The nonvolatile memory 82 stores a software provisioning agent 81 which is configured to be run by the processor 80 for receiving an Attach Request frame as defined by ETSI TS 124.008 to convey a command from the user equipment 20 and to extract a command from the IMSI field of the received Attach Request frame. The provisioning agent 81 is adapted to be run by the processor 80 for generating and sending, in response to the Attach Request frame, a response corresponding to the received command conveyed in the Authentication parameter RAND field or the Authentication parameter AUTN field of an Authentication Request frame as defined by ETSI TS 124.008.

The storage area CB contains a range of triplets including a transaction identifier 24, an IMSI 26 and a key 28. The nonvolatile memory 82 stores a software selecting agent 83 which is configured to be run by the processor 60 to find a target identifier 14 matching a transaction identifier in the range. Preferably, the storage area DB can be implemented as a database.

The nonvolatile memory 82 stores a software selecting agent 84 which is configured to be run by the processor 80 to send to the user equipment 20 both PHH$_n$ and PHL$_n$ (as defined at FIG. 1) and to generate an updated PHL$_{n+1}$ equal to PHL$_n$+(H*(PHH$_n$−PHL$_n$)/100000) and to generate an updated PHH$_{n+1}$ equal to PHL$_n$+((H+1)*(PHH$_n$−PHL$_n$)/100000).

The invention is well-suited for managing the provisioning of a fleet of user equipment.

The invention is well-suited for provisioning a user equipment (or a TRE) with Telecom credentials (IMSI/Ki). In particular, the invention apply to system comprising a Primary Boot Loader as described in the application WO2016/165900 A1 which is included in this description by reference.

The invention is not limited to the described embodiments or examples. In particular, the command identifiers may have different value for instance.

An advantage of the invention is to allow securely provisioning the essential credentials by using a 3GPP network in order to perform a legacy connection to the same 3GPP network. The invention allows breaking the endless loop where we need 3GPP credentials to access a data channel for provisioning the 3GPP credentials and there is no initial 3GPP credentials for bootstrapping the aforesaid data channel.

An advantage of the invention is to allow the selection of a local 3GPP compliant operator which is unknown at the manufacturing of the device and even after the distribution of the device on the field.

The invention claimed is:

1. A method of communication between a server and a user equipment through a set of command/response pairs:
wherein the user equipment conveys a command through an international mobile subscriber identity (IMSI) field of an Attach Request frame as defined by European Telecommunications Standards Institute Technical Specification (ETSI TS) 124.008, to convey the command of one of said pairs to the server, the server conveys a response through an Authentication parameter random number (RAND) field or an Authentication parameter (AUTN) field of an Authentication Request frame as defined by ETSI TS 124.008, to convey the response corresponding to said command, and the server sends the Authentication Request frame in response to the Attach Request frame.

2. The method according to claim 1, wherein the user equipment uses a mobile subscription identification number (MSIN) part of the IMSI field to send the command.

3. The method according to claim 1, wherein the user equipment sends an initial command to retrieve a session identifier, wherein the server sends the session identifier in response to the initial command and wherein the user equipment includes the session identifier in all subsequent commands sent to the server until a session close command.

4. The method according to claim 1, wherein the user equipment stores a target identifier uniquely allocated to said user equipment, wherein the server comprises a range of transaction identifiers, wherein the command comprises a parameter generated from the target identifier and wherein the server finds the target identifier in the range thanks to said parameter.

5. The method according to claim 4, wherein, UH denotes 64 most significant bits of the target identifier, $PHL_n$ denotes 64 most significant bits of the lower bound of the range, $PHH_n$ denotes 64 most significant bits of the upper bound of the range, H denotes a probe value comprised in the parameter, the user equipment receives from the server both $PHH_n$ and $PHL_n$, wherein H is equal to $((UH-PHL_n)*100000)/(PHH_n-PHL_n)$ and wherein the server generates an updated $PHL_n+i$ equal to $PHL_n+(H*(PHH_n-PHL_n)/100000)$ and generates an updated $PHH_n+i$ equal to $PHL_n+((H+1)*(PHH_n-PHL_n)/100000)$.

6. The method according to claim 4, wherein the user equipment embeds a tamper resistant element, wherein the user equipment sends a command to request an IMSI allocated to the user equipment, wherein, in response the server selects the IMSI thanks to the target identifier and returns the IMSI and wherein the user equipment forwards the IMSI to the tamper resistant element.

7. The method according to claim 6, wherein the user equipment sends a command to request a key allocated to a mobile operator and required to generate credentials needed to securely access a communication network, wherein, in response the server selects the key based on the target identifier and returns the key, wherein the user equipment forwards the key to the tamper resistant element and wherein the tamper resistant element computes said credentials from both the key and a seed pre-stored in the tamper resistant element.

8. The method according to claim 7, wherein the seed is retrieved from user equipment and sent to the mobile operator, wherein the mobile operator generates a mobile network operator (MNO) key pair comprising a private MNO key and a public MNO key, generates the IMSI and computes a Ki from the seed wherein, wherein the public MNO key is the key allocated to the mobile operator and wherein the mobile operator sends to the server the public MNO key, the IMSI and the target identifier.

9. The method according to claim 7, wherein the mobile operator verifies that the tamper resistant element is authentic by requesting a third party to check the seed.

10. The method according to claim 7, wherein the user equipment embeds a baseband, wherein said baseband sends any command of said set without using the tamper resistant element for retrieving from the server an IMSI and a key allocated to a mobile operator, wherein the baseband forwards both said IMSI and said key to the tamper resistant element and wherein the tamper resistant element computes a derived connection credentials according to 3rd Generation Partnership Project (3GPP) key derivation mechanism.

11. A user equipment comprising a processor configured to communicate with a server through command/response pairs:
wherein said user equipment comprises a communicating agent to be run by the processor for generating and sending an Attach Request frame as defined by European Telecommunications Standards Institute Technical Specification (ETSI TS) 124.008 to convey a command of one of said pairs to the server, said command being comprised in an international mobile subscriber identity (IMSI) field of an Attach Request frame and wherein said communicating agent is configured to be run by the processor for receiving, in response to the Attach Request frame, a response corresponding to said command conveyed in a Authentication parameter random number (RAND) field or a Authentication parameter (AUTN) field of an Authentication Request frame as defined by ETSI TS 124.008.

12. The user equipment according to claim 11, wherein the user equipment is configured to send to the server the following series of ordered commands: request a session identifier, transmission of a target identifier, request of an IMSI, request of a key allocated to a mobile operator and session closing.

13. The user equipment according to claim 11, wherein, UH denotes 64 most significant bits of the target identifier, $PHL_n$ denotes 64 most significant bits of the lower bound of a range stored in the server, $PHH_n$ denotes 64 most significant bits of the upper bound of the range, wherein the user equipment embeds a tamper resistant element comprising a processor and a software probe agent which is configured to be run by the processor of the tamper resistant element for generating a probe value (H) equal to $((UH-PHL_n)*100000)/(PHH_n-PHL_n)$.

14. A server comprising a processor and configured to communicate with a user equipment through command/response pairs:
wherein said server comprises a provisioning agent to be run by the processor for receiving an Attach Request frame as defined by European Telecommunications Standards Institute Technical Specification (ETSI TS) 124.008 to convey a command of one of said pairs from the user equipment, said command being comprised in an international mobile subscriber identity (NISI) field of an Attach Request frame and wherein said provisioning agent is configured to be run by the processor for generating and sending, in response to the Attach Request frame, a response corresponding to said command conveyed in a Authentication parameter random number (RAND) field or a Authentication parameter (AUTN) field of an Authentication Request frame as defined by ETSI TS 124.008.

15. The server according to claim 14, wherein the user equipment is configured to store a target identifier uniquely allocated to said user equipment, wherein the server stores a range of transaction identifiers, wherein the command comprises a parameter generated from the target identifier and wherein the server is configured to find the target identifier in the range by using said parameter.

16. The server according to claim 14, wherein, UH denotes 64 most significant bits of the target identifier, $PHL_n$ denotes 64 most significant bits of the lower bound of the range, $PHH_n$ denotes 64 most significant bits of the upper bound of the range, H denotes a probe value comprised in the parameter, the server is configured to send to the user equipment both $PHH_n$ and $PHL_n$, wherein H is equal to $((UH-PHL_n)*100000)/(PHH_n-PHL_n)$ and wherein the server is configured to generate an updated $PHL_n+i$ equal to $PHL_n+(H*(PHH_n-PHL_n)/100000)$ and to generate an updated $PHH_{n+1}$ equal to $PHL_n+((H+1)*(PHH_n-PHL_n)/100000)$.

\* \* \* \* \*